United States Patent
McNew

(10) Patent No.: US 9,969,404 B2
(45) Date of Patent: May 15, 2018

(54) CONVEYANCE OF REQUIRED DRIVER BEHAVIORS USING PERSISTENT PATTERNED SOUND

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 15/173,601

(22) Filed: Jun. 3, 2016

(65) Prior Publication Data

US 2017/0349185 A1 Dec. 7, 2017

(51) Int. Cl.
| | |
|---|---|
| *B60W 50/08* | (2012.01) |
| *B60Q 9/00* | (2006.01) |
| *B60W 50/16* | (2012.01) |
| *G05B 9/02* | (2006.01) |
| *B60W 50/14* | (2012.01) |

(52) U.S. Cl.
CPC ............ *B60W 50/082* (2013.01); *B60Q 9/00* (2013.01); *B60W 50/14* (2013.01); *B60W 50/16* (2013.01); *G05B 9/02* (2013.01)

(58) Field of Classification Search
CPC .................................. B60W 30/00; G05B 9/02
See application file for complete search history.

(56) References Cited

U.S. PATENT DOCUMENTS

| | | | |
|---|---|---|---|
| 8,573,976 B2* | 11/2013 | Lecointre ............ | B60R 16/0236 |
| | | | 434/29 |
| 2002/0011928 A1 | 1/2002 | Williams | |
| 2007/0203617 A1 | 8/2007 | Haug | |
| 2014/0148988 A1 | 5/2014 | Lathrop et al. | |
| 2015/0070160 A1* | 3/2015 | Davidsson ............ | B60W 50/14 |
| | | | 340/457 |
| 2016/0031441 A1* | 2/2016 | Foley .................... | B60W 30/00 |
| | | | 701/23 |
| 2016/0041553 A1 | 2/2016 | Sato et al. | |
| 2016/0121907 A1* | 5/2016 | Otake ................... | B60W 50/14 |
| | | | 701/23 |
| 2017/0066453 A1* | 3/2017 | Hunt ..................... | B60W 40/09 |
| 2017/0334453 A1* | 11/2017 | Mimura ................ | B60W 10/20 |

FOREIGN PATENT DOCUMENTS

EP         2902877 A1     8/2015

* cited by examiner

*Primary Examiner* — Krishnan Ramesh
(74) *Attorney, Agent, or Firm* — Christopher G. Darrow; Darrow Mustafa PC

(57) ABSTRACT

A computing system for a vehicle includes one or more processors for controlling operation of the computing system, and a memory for storing data and program instructions usable by the one or more processors. The one or more processors are configured to execute instructions stored in the memory to determine required driver behaviors, determine a persistent sound indicative of the required driver behaviors, and generate a notification including the sound.

18 Claims, 6 Drawing Sheets

|  |  |  |  |  |  |
|---|---|---|---|---|---|
| Sensor 1 | 0 | 1 | 1 | 1 | 1 |
| Sensor 2 | 1 | 0 | 1 | 1 | 1 |
| Sensor 3 | 1 | 1 | 1 | 1 | 1 |
| Sensor 4 | 1 | 1 | 1 | 1 | 1 |
| Actuator 1 | 1 | 1 | 0 | 1 | 1 |
| Actuator 2 | 1 | 1 | 1 | 1 | 1 |
| ACC Control | 1 | 1 | 1 | 1 | 1 |
| Lane Keeping Control | 1 | 1 | 1 | 0 | 1 |
| 703 — ACC | 0 | 0 | 0 | 1 | 1 |
| 701 — Lane Keeping | 0 | 1 | 1 | 0 | 1 |

Driver Assistance System Statuses

FIG. 4

1 Feet on the accelerator and/or brake pedals
2 Hands on Wheel
3 Eyes on Road
4 Seat pointing forward/not Swiveled (define) and upright
5 Driver Must be awake
6 0 behaviors required

POSSIBLE DRIVING BEHAVIORS

FIG. 5

CONVEYANCE OF REQUIRED DRIVER BEHAVIORS USING PERSISTENT PATTERNED SOUND

TECHNICAL FIELD

The present disclosure relates to semi-autonomous and autonomous control of vehicles, and, more particularly, to a system and method conveying required driver behaviors to a driver in accordance with a level of autonomous operation of the vehicle.

BACKGROUND

Vehicles may be configured for operation in various autonomous and semi-autonomous modes. Some of these modes may not be available under all possible driving conditions. In addition, based on the driving conditions and on the operational status of vehicle systems and components, the availabilities of various autonomous and semi-autonomous modes may change during driving. Such changes may alter the demands on the driver. For example, if a first, relatively higher-level autonomous mode becomes unavailable or impractical due to changes in vehicle systems or vehicle operating conditions, the driver may need to exercise a greater degree of control over the vehicle. The driver should be constantly informed and updated regarding required driver behaviors.

SUMMARY OF THE INVENTION

In one aspect of the embodiments described herein, a computing system for a vehicle is provided. The computing system includes one or more processors for controlling operation of the computing system, and a memory for storing data and program instructions usable by the one or more processors. The one or more processors are configured to execute instructions stored in the memory to determine required driver behaviors, determine a persistent sound indicative of the required driver behaviors, and generate a notification including the sound.

In another aspect of the embodiments described herein, a method is provided for informing a driver of required driver behaviors during autonomous or semi-autonomous operation of a vehicle. The method includes steps of determining required driver behaviors, determining a persistent sound indicative of the required driver behaviors, and generating a notification including the sound.

In another aspect of the embodiments described herein, a non-transitory computer readable medium is provided. The medium has stored therein instructions executable by a computer system to cause the computer system to perform functions, the functions comprising determining required driver behaviors, determining a persistent sound indicative of the required driver behaviors, and generating a notification including the sound.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 4 shows a method for determining available driving assistance capabilities based on the statuses of the vehicle control components, in accordance with the control arrangement shown in FIG. 3.

FIG. 5 shows a method of ranking required driver behaviors, in accordance with an embodiment described herein.

DETAILED DESCRIPTION

Figure 1:
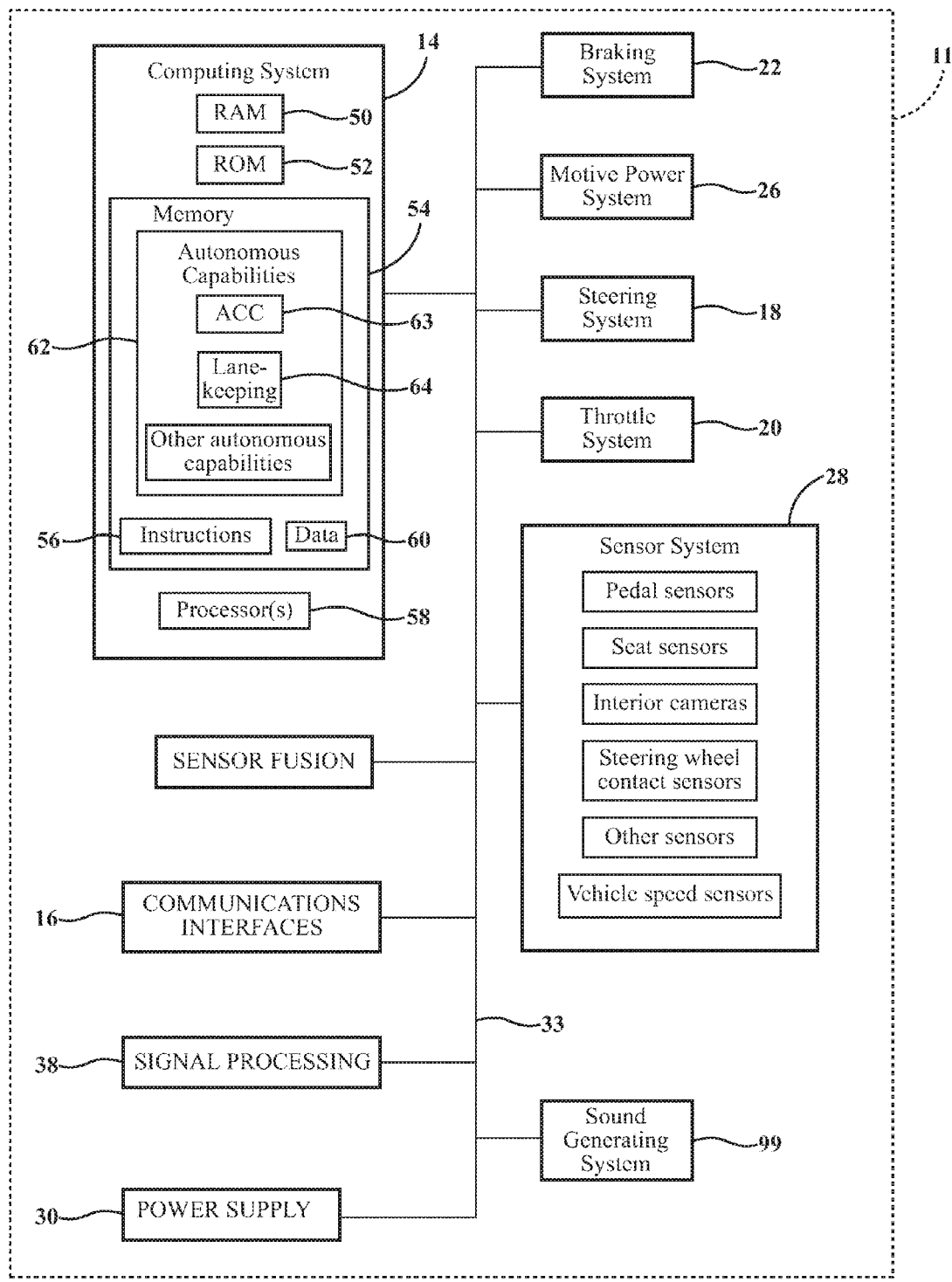
FIG. 1 is a schematic block diagram of a vehicle computing system in accordance with an embodiment described herein.

This application describes monitoring current autonomous capabilities of a vehicle based on driving conditions (i.e., vehicle internal parameters (such as current autonomous driver assistance capability availability), external parameters (such as current vehicle operating conditions), and possibly other factors). Based on the statuses of these parameters, required driver behaviors for the current level of autonomous capability are determined. The required behaviors are conveyed to the driver via a persistent patterned sound. A distinctive sound is provided for each distinctive combination of required driver behaviors. The sound conveyed to the driver is changed in accordance with changes in the required behaviors, as determined with regard to the current driving conditions. Any changes in the required behaviors and the associated persistent sound may be prefaced by a transitional sound which informs the driver that the required behaviors are changing. The vehicle systems may also monitor driver compliance with the required behaviors and notify the driver of non-compliance using an associated distinctive sound representing non-compliance.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Also disclosed herein are non-transitory computer readable media with stored instructions. The instructions could be executable by a computing system or device to cause the computing system or device to perform functions similar to those described in the methods described below.

As will be appreciated by one skilled in the pertinent art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data, instructions or events as described herein may be transferred between a source and a destination in the form of electromagnetic waves traveling through signal-conducting media such as metal wires, optical fibers, and/or wireless transmission media (e.g., air and/or space).

FIG. 1 is a functional block diagram illustrating a vehicle or ego-vehicle 11 in accordance with an example embodiment. The vehicle 11 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other types of vehicles are possible as well. The vehicle 11 may be configured to operate fully or partially in an autonomous mode. While in autonomous mode, the vehicle 11 may be configured to operate without human interaction. For example, in an autonomous mode in which an adaptive cruise control (ACC) system is activated, the vehicle 11 may operate the throttle, braking and other systems so as to maintain a safe distance from a vehicle traveling ahead of the vehicle 11, without input from a vehicle occupant.

The vehicle 11 may include various systems, subsystems and components in operative communication with each other, such as a sensor system or array 28, a computing system 14, one or more communications interfaces 16, a steering system 18, a throttle system 20, a braking system 22, a power supply 30, a motive power system 26, and other systems and components needed for operating the vehicle as described herein. The vehicle 11 may include more or fewer subsystems and each subsystem could include multiple elements. Further, each of the subsystems and elements of vehicle 11 could be interconnected. Thus, one or more of the described functions of the vehicle 11 may be divided up into additional functional or physical components or combined into fewer functional or physical components. In some further examples, additional functional and physical components may be added to the examples illustrated by FIG. 1.

The sensor system 28 may include a number of sensors configured to sense information about an external environment of the vehicle 11. For example, the sensor system 28 may include a navigation unit such as a Global Positioning System (GPS), an inertial measurement unit (IMU), a RADAR unit, a laser rangefinder/LIDAR unit, and one or more cameras comprising devices configured to capture a plurality of images of the interior of the vehicle and/or an external environment of the vehicle 11. The camera(s) 130 may be still cameras or video The IMU may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the vehicle 11. To this end, the navigation unit may include a one or more transceivers, including a transceiver operable to provide information regarding the position of the vehicle 11 with respect to Earth.

The sensor system 28 may also include sensors configured to monitor internal systems, components, and/or conditions of the vehicle 11 (e.g., an 02 monitor, a fuel gauge, an engine oil temperature). Other sensors are possible as well. One or more of the sensors included in the sensor system 104 may be configured to be actuated separately or collectively in order to modify a position, an orientation, or both, of the one or more sensors.

In a known manner, the vehicle sensors 28 provide data used by the computing system 14 in formulating and executing suitable control commands for the various vehicle systems. For example, data from inertial sensors, wheel speed sensors, road condition sensors, and steering angle sensors may be processed in formulating and executing a command in steering system 18 to turn the vehicle. Vehicle sensors 28 may include any sensors required to support any driver assistance capabilities incorporated into the vehicle 11.

The sensor system 28 can include any suitable type of sensor. Various examples of different types of sensors will be described herein. However, it will be understood that the embodiments are not limited to the particular sensors described. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 11.

The sensor system 28 may include various types of sensors in communication with other control system components, for providing feedback on operations of the vehicle. For example, sensors 28 may detect and store data corresponding to the vehicle's location (e.g., GPS coordinates), speed and direction, rates of acceleration or braking, and specific instances of sudden acceleration, braking, and swerving. Sensors 28 also may detect and store data received from the vehicle's internal systems, relating to such factors as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's various computing devices.

Additional ones of sensors 28 may detect and store information relating to external driving conditions, for example, external temperature, rain, snow, light levels, and sun position for driver visibility. For example, external cameras and proximity sensors 28 may detect other nearby vehicles, traffic levels, road conditions, traffic obstructions, animals, cyclists, pedestrians, and other conditions that may factor into a driving event data analysis. Sensors 28 also may detect obstacles in the driving path of the vehicle and the speeds, positions, driving directions and movements of other vehicles with respect to the vehicle 11. Sensors 28 also may detect and store data relating to moving violations and the observance of traffic signals and signs by the vehicle. Additional ones of sensors 28 may detect and store data relating to the maintenance of the vehicle, such as the engine status, oil level, engine coolant temperature, odometer reading, the level of fuel in the fuel tank and/or the battery or electrical power level in a gas-hybrid vehicle (for example, fuel/battery power level sensors 28c), engine revolutions per minute (RPMs), and/or tire pressure. Additional ones of sensors 28 may detect the orientation of the driver seat (for example, whether the driver seat is facing toward a front of the vehicle or is swiveled or rotated so as to face in another direction). Additional ones of sensors 28 may detect an angular orientation of a seat back of the driver's seat, to determine if the seat back is upright or reclined. Additional ones of sensors 28 may detect the presence or absence of a driver's hands on the vehicle steering wheel, the presence or absence of a vehicle occupant in a particular seat (for example, occupant detection sensors 28$a$), and the presence or absence of the driver's feet on one or more of the accelerator, brake and clutch pedals.

Vehicle sensors 28 also may include cameras and/or proximity sensors capable of recording additional conditions inside or outside of the vehicle. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 28 also may be configured to collect data a driver's movements or the condition of a driver. For example, vehicle 11 may include sensors that monitor a driver's movements, such as the driver's eye position and/or head position, whether the driver's eyes are on the road, etc. Additional ones of sensors 28 may collect data regarding the physical or mental state of the driver, such as fatigue or intoxication, or whether the driver is asleep. The condition of the driver may also be determined through the movements of the driver or through other sensors, for example, sensors that detect the direction in which the driver's eyes are facing or which detect the content of alcohol in the air or blood alcohol content of the driver, such as a breathalyzer. These sensors may be operatively coupled to a driver monitoring system or routine incorporated into computing system 14.

Certain of vehicle sensors 28 also may collect information regarding the driver's route choice, whether the driver follows a given route, and to classify the type of trip (e.g. commute, errand, new route, etc.). In certain embodiments, sensors and/or cameras may determine when and how often the vehicle stays in a single lane or stray into other lanes. A Global Positioning System (GPS), locational sensors positioned inside the vehicle, and/or locational sensors or devices external to the vehicle may be used determine the route, lane position, and other vehicle position/location data. Any data collected by vehicle sensors 28 may also be transmitted to any vehicle system or component requiring or utilizing the data for the purposes described herein. For example, the data collected by vehicle sensors 28 may be transmitted to computing system 14, or to one or more specialized system or component controllers (not shown). Additional particular types of sensors may include any other types of sensors needed to perform the functions and operations described herein.

Information from particular vehicle sensors may be processed and used to control more than one vehicle system or component. For example, in a vehicle incorporating both automated steering and braking control, various road condition sensors may provide data to the computing system to enable the computing system to process the road condition information in accordance with stored processor-executable instructions, and to formulate appropriate control commands to both the steering system and braking system.

If a sensor output signal or other signal requires pre-processing prior to use by the computing system or another vehicular (or extra-vehicular) system or element, a known or suitable processing means (for example, an analog-to-digital (A/D) converter or digital-to-analog (D/A) converter) may be introduced between the sensor system (or the pertinent sensor(s)) and the pertinent system/element or incorporated into the pertinent system/element. Similarly, if operation of any actuatable sub-system or sub-system components (for example, components of the steering system or throttle system) will require processing of a control signal received from the computing system prior to use, a known or suitable processing means may be introduced between the computing system and the actuatable sub-system components or incorporated into the sub-system.

The sensor fusion algorithm 138 may be an algorithm (or a computer program product storing an algorithm) configured to accept data from the sensor system 28 as an input. The data may include, for example, data representing information sensed at the sensors of the sensor system 28. The sensor fusion algorithm may process data received from the sensor system to generate an integrated or composite signal (formed, for example, from outputs of multiple individual sensors). The sensor fusion algorithm 138 may include, for instance, a Kalman filter, a Bayesian network, or other algorithm. The sensor fusion algorithm 138 may further provide various assessments based on data from the sensor system 104. In an example embodiment, the assessments may include evaluations of individual objects or features in the environment of the vehicle 11, evaluation of a particular situation, and evaluate possible impacts based on the particular situation. Other assessments are possible. The sensor fusion algorithm 138 may be stored on a memory (such as memory 54) incorporated into or in operative communication with computing system 14 of another computing system or device, may be executed by the associated computing system or device, in a manner known in the art.

The use of "continuously" when referring to the reception, gathering, monitoring, processing, and/or determination of any information or parameters described herein means that the computing system 14 is configured to receive and/or process any information relating to these parameters as soon as the information exists or is detected, or as soon as possible in accordance with sensor acquisition and processor processing cycles. For example, a failure of a sensor used for automated vehicle control may become known when a test signal transmitted through the sensor produces a negative result, or when the automated system employing the sensor attempts to use the sensor for vehicle control. As soon as the computing system 14 receives data from sensors or information relating to the status of a vehicle component for example, the computing system acts in accordance with stored programming instructions. Similarly, the computing system may receive and process an ongoing or continuous flow of information from sensor system 28 and from other information sources. This information is processed and/or evaluated in accordance with instructions stored in a memory, in a manner and for the purposes described herein.

The computing system 14 may be operatively connected to the other vehicle systems and elements and otherwise configured so as to affect control and operation of the vehicle 11 and its components as described herein. The computing system 14 may be configured to perform all of the analysis, evaluation, determination, and other decision-making and control-related functions described herein. The computing system 14 may be configured to control at least some systems and/or components autonomously (without user input) and/or semi-autonomously (with some degree of user input). The computing system may also be configured to control and/or execute certain functions autonomously and/ or semi-autonomously. The computing system 14 may additionally or alternatively include components other than those shown and described.

The computing system 14 may control the functioning of the vehicle 11 based on inputs and/or information received from various subsystems (e.g., motive power system 26, sensor system 28, steering system 18, etc.), from any of the communications interfaces 16, and/or from any other suitable source of information. In an example embodiment, the computing system 14 could be operable to provide control over many aspects of the vehicle 11 and its subsystems.

It will be understood that one or more of the functions, methods and/or and capabilities described herein as being performed by the computing system 14 may be performed by a single computing device of computing system 14 or by multiple computing devices (or portions of multiple computing devices) of computing system 14 arranged in operative communication with each other and operating in a coordinated fashion to perform the desired functions, methods and operations. In this case, multiple distributed computing devices may act in cooperation to effectively operate as a single computing device for purposes of performing the one or more of the functions, methods and/or capabilities.

FIG. 1 illustrates a block diagram of an exemplary computing system according to one or more illustrative embodiments of the disclosure. The computing system 14 may have some or all of the elements shown in FIG. 1. In addition, the computing system 14 may also include additional components as needed or desired for particular applications. The computing system 14 may also represent or be embodied in a plurality of controllers or computing devices that may process information and/or serve to control individual components or subsystems of the vehicle 11 in a distributed fashion. Many or all of the functions of the vehicle 11 could be controlled by the computing system 14.

The computing system 14 may include one or more processors 58 (which could include at least one microprocessor) for controlling overall operation of the computing system 14 and associated components, and which executes instructions stored in a non-transitory computer readable medium, such as the memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11. For instance, the processor(s) 58 can be part of an electronic control unit (ECU).

In some embodiments, the computing system 14 may include RAM 50, ROM 52, and/or any other suitable form of computer-readable memory. The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM (Random Access Memory), a PROM (Programmable Read-Only Memory), an EPROM (Erasable Programmable Read-Only Memory), a FLASH-EEPROM (Electrically Erasable Programmable Read-Only Memory), any other memory chip or cartridge, or any other medium or any combination thereof from which computer programmable instructions or code can read. The memory or memories 54 can be a component of the computing system 14, or the memory or memories can be operatively connected to the computing system 14 for use thereby. The term "operatively connected," as used throughout this description, can include direct or indirect connections, including connections without direct physical contact.

The memory 54 may contain data 60 and/or instructions 56 (e.g., program logic) executable by the processor(s) 58 to execute various functions of the vehicle 11, including those described above in connection with FIG. 1. The memory 54 may contain additional instructions as well, including instructions to transmit data to, receive data from, interact with, or control one or more of the vehicle systems and/or components described herein (for example, motive power system 26, sensor system 28, computing system 14, and the communication interfaces 16). In addition to the instructions 56, the memory 54 may store data such as roadway maps, path information, among other information. Such information may be used by the vehicle 11 and the computer system 14 at during the operation of the vehicle 11 in the autonomous, semi-autonomous, and/or manual modes.

The computing system 14 may be configured to coordinate control of the various actuatable vehicle systems and components so as to implement one or more autonomous vehicle control capabilities including autonomous driving assistance capabilities (generally designated 62). These autonomous capabilities 62 may be stored in memory 54 and/or in other memories and implemented in the form of computer-readable program code that, when executed by a processor, implement one or more of the various processes, instructions or functions described herein. A driving assistance capability may be defined as a capability which assists a driver in operating the vehicle by performing one or more functions which may be performed by the driver if the capability is absent or deactivated. Examples of driving assistance capabilities include adaptive cruise control (ACC) 63 and lane-keeping 64.

An adaptive cruise control capability 63 may be defined as a cruise control system that automatically adjusts the vehicle speed to maintain a safe distance from vehicles ahead, based in information from onboard vehicle sensors. Thus, responsive to inputs from the vehicle sensors, for example, the computing system 14 may control the throttle system, braking system, motive power system and any other pertinent systems as required to implement the ACC functions.

A Lane Keeping capability 64 may be defined as a system designed to alert the driver when the system detects that the vehicle is about to leave or deviate from a traffic lane. Thus, responsive to inputs from the vehicle sensors, for example, the computing system 14 may control the steering and other pertinent systems as required to implement the lane-keeping functions.

In one or more arrangements, the computing system 14 described herein can incorporate artificial or computational intelligence elements, e.g., neural network, fuzzy logic or other machine learning algorithms. Further, in one or more arrangements, the hardware and/or software elements configured for performing particular functions or operations described herein may be distributed among a plurality of elements and/or locations.

In addition to computing system 14, the vehicle may incorporate additional computing systems and/or devices (not shown) to augment or support the control functions performed by computing system 14, or for other purposes.

Communications interfaces 16 may be configured to allow interaction between the vehicle 11 and external sensors, other vehicles, other computer systems, various external messaging and communications systems (such as a satellite system or cellular phone/wireless communication system) and/or a user. The communications interfaces 16 may include a user interface for providing information to or receiving input from a user of the vehicle 11. For example, the communications interfaces 16 may include a voice/audio interface 19 (for example, a microphone and speaker for providing audio input and output), keypad, touch screen, and/or stylus through which a user of the computing system 14 may provide input, and may also include and a video display device 17 for providing textual, audiovisual and/or graphical output from the computing system. The computing system 14 may be configured to interpret or process any received audio input as a response to a query or an instruction for the computing system. The user interface may control or enable control of content and the layout of interactive images that may be displayed on the display. A display in the form of a touch screen may provide information to a user of the vehicle 11. The user interface could also be operable to accept input from the user via the touch screen. The touch screen may be configured to sense at least one of a position and a movement of a user's finger via capacitive sensing, resistance sensing, or a surface acoustic wave process, among other possibilities. The touch screen may be capable of sensing finger movement in a direction parallel or planar to the touch screen surface, in a direction normal to the touch screen surface, or both, and may also be capable of sensing a level of pressure applied to the touch screen surface. The touch screen may be formed of one or more translucent or transparent insulating layers and one or more translucent or transparent conducting layers. The touch screen may take other forms as well.

The display can be any other suitable type of display. For instance, the display can be a liquid crystal display (LCD), a light emitting diode (LED) display or some other suitable display. In one or more arrangements, the display can be a heads-up display, a display for a navigation system, and/or a display included in an instrument cluster. The display(s) can be provided in any suitable location within the vehicle 11.

In other instances, the communications interfaces 16 may provide means for the vehicle 11 to communicate with devices within its environment. For example, a microphone (not shown) may be configured to receive audio (e.g., a voice command or other audio input) from a user of the vehicle 11. Similarly, speakers (not shown) may be configured to output audio to a user of the vehicle 11.

Computing system 14 may operate in a networked environment supporting connections to one or more remote computers, such as other computing devices, terminals and/or mobile devices (e.g., mobile phones, short-range vehicle communication systems, vehicle telematics devices and vehicle-to-vehicle communications systems)(not shown). Any other computing systems or devices in the vehicle and any related terminals or devices in operative communication with computing system 14 may include devices installed in vehicles, mobile devices that may travel within vehicles, or devices outside of vehicles that are configured to receive and process vehicle and driving data. Thus, any terminals or devices in communication with the computing system 14 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband and the like)(not shown), and may include some or all of the elements described above with respect to the computing system 14. In addition, any of these device embodiments may include a haptic interface or may be configured to provide haptic feedback to a vehicle occupant to inform the occupant of any information or condition which should be communicated to the occupant.

The communications interfaces 16 may also include interfaces enabling communication in a wide area network (WAN), a wireless telecommunications network, and/or other communications networks. The network(s) described herein can be implemented as, or include, without limitation, a dedicated short-range communication (DSRC) network, a wide area network (WAN), a local area network (LAN), the Public Switched Telephone Network (PSTN), a wireless network, a mobile network, a Virtual Private Network (VPN), the Internet, and/or one or more intranets. The communication network(s) further can be implemented as or include one or more wireless networks, whether short or long range. For example, in terms of short range wireless networks, the communication network(s) can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network(s) can include a mobile, cellular, and or satellite-based wireless network and support voice, video, text, and/or any combination thereof. Examples of long range wireless networks can include GSM, TDMA, CDMA, WCDMA networks or the like. The communication network(s) can include wired communication links and/or wireless communication links. The communication network(s) can include any combination of the above networks and/or other types of networks. The communication network(s) can include one or more routers, switches, access points, wireless access points, and/or the like. In one or more arrangements, the communication network(s) can include Vehicle-to-Everything (V2X) technologies (including Vehicle-to-Infrastructure (V21) and Vehicle-to-Vehicle (V2V) technologies), which can allow for communications between any nearby vehicle(s), and the vehicle 11 and any nearby roadside communications nodes and/or infrastructure.

When used in a WAN networking environment, the computing system 14 may include (or be operatively connected to) a modem or other means for establishing communications over the WAN, such as network (e.g., the Internet). When used in a wireless telecommunications network, the computing system 14 may include (or be operatively connected to) one or more transceivers, digital signal processors, and additional circuitry and software for communicating with wireless computing devices (not shown) via one or more network devices (e.g., base transceiver stations) in the wireless network. These configurations provide various ways of receiving a constant flow of information relating to vehicle operating conditions from external various sources.

Computing system 14 may be configured to serve as an autonomous driving computer or module, coordinating and controlling (or assisting in coordinated control of) all autonomous driving operations, including steering, braking, etc. Implementation of certain autonomous driving assistance capabilities as described herein may involve combining or integrating certain operations of vehicle systems. For example, implementation of adaptive cruise control (ACC) may require coordinated operation of at least elements of the throttle control system 20 and the braking system 18 (described below). Computing system 14 may be configured to coordinate such combined operations to help ensure that full autonomous capability of the vehicle is realized.

The vehicle 11 may include various actuatable sub-systems and elements in operative communication with computing system 14 and other vehicle systems and/or components, and which are operable (at least to some degree) responsive to control commands received from the computing system. Various actuatable sub-systems and elements may be controlled manually or automatically (by computing system 14) depending on such factors as a given driving situation and/or whether autonomous driving assistance systems (for example, ACC and/or lane keeping) are activated.

The steering system may include such elements as the vehicle wheels, rack-and-pinion steering gears, steering knuckles, and/or any other elements or combination of elements that may be operable to adjust the heading of vehicle 11.

The wheels (not shown) of the vehicle 11 may be tires. The wheels of the vehicle 11 may be configured in various formats, including a unicycle, bicycle, tricycle, or a four-wheel format, such as on a car or a truck, for example. Other wheel geometries are possible, such as those including six or more wheels. Any combination of the wheels of vehicle 11 may be operable to rotate differentially with respect to other wheels. The wheels may represent at least one wheel that is operatively coupled to the transmission (not shown) and at least one tire coupled to a rim of the wheel that could make contact with the driving surface. The wheels may include a combination of metal and rubber, or another combination of materials.

The motive power system 26 may include components operable to provide powered motion for the vehicle 11. In an example embodiment, the motive power system 26 may include an engine (not shown), an energy source (such as gasoline, diesel fuel, or a one or more electric batteries in the case of a hybrid vehicle), and a transmission (not shown). The engine may be any combination of an internal combustion engine, an electric motor, steam engine, Stirling engine, or other types of engines or motors. In some example embodiments, the motive power system 26 may include multiple types of engines or motors. For instance, a gas-electric hybrid car could include a gasoline engine and an electric motor. Other examples are possible.

The transmission may include elements that are operable to transmit mechanical power from the engine to the wheels. To this end, the transmission could include a gearbox, a clutch, a differential, and drive shafts. The transmission may include other elements. The drive shafts may include one or more axles that could be coupled to the one or more vehicle wheels.

The braking system 22 could include any combination of elements and/or mechanisms configured to decelerate the vehicle 11. The braking system 22 could use friction to slow the wheels. In other embodiments, the braking system 22 may convert the kinetic energy of the wheels to electric current. The braking system 22 may take other forms as well. The throttle system may include elements and/or mechanisms (for example, an accelerator pedal) configured to control, for instance, the operating speed of the engine and, in turn, control the speed of the vehicle 11.

FIG. 1 shows just a few examples of vehicle sub-systems 18, 20, 22, 26 which may be incorporated into a vehicle. A particular vehicle may incorporate one or more of these systems or other systems (not shown) in addition to one or more of the systems shown.

The power supply 30 may provide power to various components of the vehicle 11 and could represent, for example, a rechargeable lithium-ion or lead-acid battery. In some embodiments, one or more banks of such batteries could be configured to provide electrical power. Other power supply materials and configurations are possible. In some embodiments, the power supply 30 and the energy source (not shown) could be implemented together, as in some all-electric cars.

The vehicle 11 may be configured so that the computing system 14, sensor system 28, actuatable sub-systems 18, 20, 22, 26 and other systems and elements thereof can communicate with each other using a controller area network (CAN) bus 33 or the like. Via the CAN bus and/or other wired or wireless mechanisms, the computing system 14 may transmit messages to (and/or receive messages from) the various vehicle systems and components. Alternatively, any of the elements and/or systems described herein may be directly connected to each other without the use of a bus. Also, connections between the elements and/or systems described herein may be through a physical medium (such as wired connections) or the connections may be wireless connections.

Although FIG. 1 shows various components of vehicle 11, computing system 14, memory 54, and communications interfaces 16, as being integrated into the vehicle 11, one or more of these components could be mounted or associated separately from the vehicle 11. For example, memory could, in part or in full, exist separate from the vehicle 11. Thus, the vehicle 11 could be provided in the form of device elements that may be located separately or together. The device elements that make up vehicle 11 could be communicatively coupled together in a wired or wireless fashion.

Embodiments of the vehicle 11 described herein include elements and systems configured to inform a driver of behaviors required of the driver during operation of the vehicle in an autonomous or semi-autonomous mode. Embodiments of the vehicle 11 described herein also include elements and systems configured to determine driver compliance with the required driver behaviors, and if the driver is not complying with the required driver behaviors, notify the driver that the required behaviors are not being complied with.

Embodiments of the vehicle 11 described herein may also include elements and systems configured to (based on the latest driver assistance system availability and vehicle operating condition information) process the driving assistance system availability information and vehicle operating condition information to determine if the vehicle can, under the current driving conditions, warn the driver of a condition necessitating driver control or increased driver involvement, in time for the driver to reassert control of the vehicle (i.e., a relative ability to "warn driver") within a predetermined time period.

The driving assistance system availability information and vehicle operating condition information may also be used to determine if the vehicle can, under the current driving conditions, position and/or operate itself so as to remain in a safe condition until the driver can reassert control of the vehicle, even if the driver cannot reassert control within the predetermined time period.

The vehicle systems and control parameters are configured to help ensure that the vehicle can meet at least one of these conditions, under any set of driving conditions. Thus, depending on the driving conditions (i.e., driver assistance system availability and vehicle operating conditions), the computing system will determine driver behaviors required in order to help ensure that the vehicle can meet at least one of these two conditions. The computing system 14 may also continuously determine a persistent sound indicative of (and distinctive to) a particular combination of required driver behaviors. The computing system 14 may also continuously generate a notification to the driver (including the persistent sound) indicating what these required driver behaviors are, a notification indicating that the required behaviors are about to change, or that the required behaviors are not being complied with. The computing system 14 may also continuously redetermine the required driver behaviors based on changing driving conditions, and revise the persistent sound as needed to reflect the currently required driver behaviors.

Computing system 14 may also be configured to continuously determine if the required driver behaviors are being complied with. Computing system 14 may also be configured to, if the required behaviors are not being complied with, determine a sound indicating non-compliance, and provide a sound notification including the sound indicating non-compliance. Computing system 14 may also be configured to, if compliance with the behaviors is reestablished or the required behaviors are being complied with, discontinue any in-process non-compliance notifications and provide a notification including a sound indicative of the currently required driver behaviors.

To determine the driver behaviors required in a given set of operating conditions, embodiments of the vehicle 11 described herein include elements and systems configured to determine current driving conditions of the vehicle. Current driving conditions may include vehicle internal factors affecting vehicle operation (such as driver assistance capability availability) and current vehicle operating conditions (such as traffic density, the presence of a road shoulder, the proximity of a road shoulder, ego-vehicle speed, and sensor range, for example). Other factors may also be considered.

In determining the current driving conditions, the vehicle systems may be configured to determine an autonomous driver assistance capability availability of the vehicle. An autonomous driver assistance capability may be a vehicle capability which assists the driver by performing one or more activities which would otherwise be performed by the driver. Non-exclusive examples of such capabilities include adaptive cruise control (ACC), lane-keeping or lane-centering, automated parking, and/or any other capabilities usable for controlling aspects of vehicle operation without driver input. These capabilities are provided by the interactive operation of various sensors, actuatable control components (such as vehicle brakes, steering components, etc.), and computing system 14 which receives vehicle internal and external information, processes this information, and operates portions of the vehicle to automatically perform associated driver assistance functions.

In embodiments described herein, a vehicle is considered to include a given automated driver assistance capability if processor-executable instructions for operating the driver assistance capability are stored on a memory (for example, memory 54), and if associated sensors, actuatable components and other elements needed for operation of the driver assistance capability are operatively coupled to a computing system or device (such as computing system 14) configured to execute the instructions so as to exercise the automated assistance capability.

Computing system 14 may be configured to receive and process information relating to the status of driver assistance system components as described herein. Computing system 14 may also be configured to, using the received information, continuously determine the driver assistance capabilities currently available in the vehicle.

A driver assistance capability may be considered currently available if all of the elements necessary for operation of the capability are currently able to perform their respective functions. However, a driver assistance capability may be considered unavailable if one or more of the elements (sensor(s), computing device/processor, actuatable element(s)) are malfunctioning or are otherwise unable to perform their functions. Thus, the availability of any given driver assistance capability at any given time may depend on the operational statuses of the vehicle control components which operate to perform the driving assistance function.

Vehicle control components may be any components that participate in control and/or operation of a vehicle control system. Non-exclusive examples of such components include the vehicle sensors, computing systems or devices (such as computing system 14) and any actuatable elements of the vehicle, which are operable responsive to control commands received from the computing system 14, as previously described. Generally, a vehicle control component may have a status of "available" or "unavailable". The control component is considered to be available when functioning properly, and "unavailable" when not functioning properly. One or more of the computing device(s) incorporated into the vehicle are configured to receive information relating to the availability of the driver assistance capabilities and to process such information to determine the availability of the driver assistance capabilities.

A vehicle control component may be unavailable due to malfunction (for example, due to a short or open circuit, internal damage, etc.). Also, available driver assistance capabilities may change at any time during driving. For example, a sensor may "drop out" or malfunction, or vehicle operating conditions may change, impairing the operation of one or more sensors or vehicle systems. A sensor may "drop out" or register as "unavailable" if computing system 14 determines that vehicle operating conditions are outside design parameters specified for reliable operation of the sensor. A sensor dropout may affect the available automation levels and, consequently, the associated required driver behaviors as described herein. For example, a sensor dropout may eliminate an otherwise available driving assistance capability. In this case, if the required driver behaviors change, the generated sound indicating the required behaviors will also change. Computing system 14 is configured to constantly monitor the status of the various driver assistance systems and their constituent control components, and also to constantly monitor the operational status of other vehicle systems and elements.

Figure 3:
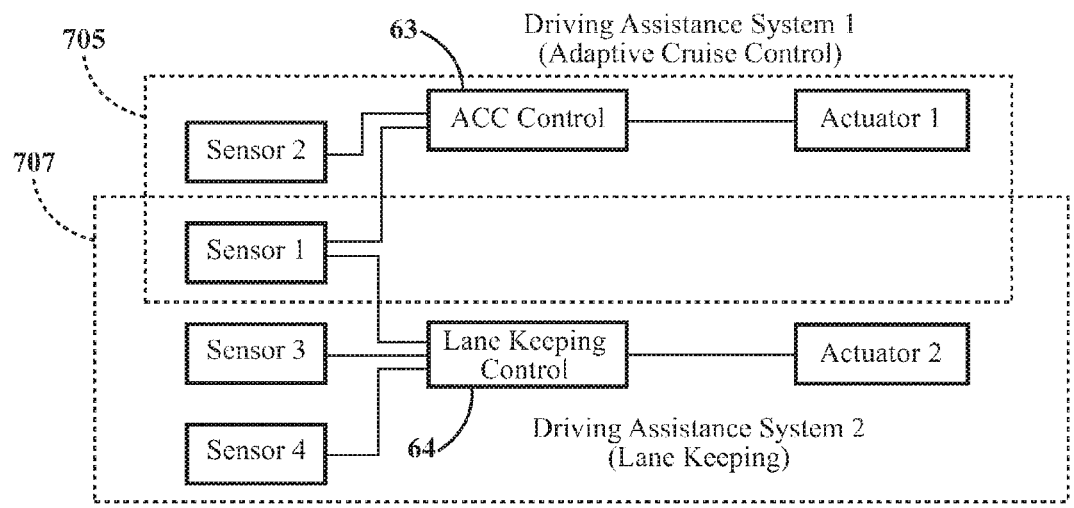
FIG. 3 is a schematic view of an exemplary control arrangement for vehicle autonomous systems.

FIGS. 3 and 4 illustrate one possible method for assigning a numerical value to driving assistance system availability. FIG. 4 shows a method for determining the available driving assistance capabilities based on the statuses of the vehicle control components. The embodiment of FIG. 4 uses a lookup table. An associated exemplary control component arrangement is shown schematically in FIG. 3.

Referring to FIG. 3, the vehicle systems and/or components shown in block 705 combine to provide the ACC capability. Also, the vehicle systems and/or components shown in block 707 combine to provide the lane-keeping capability. Each set of values presented in a column of the lookup table in FIG. 4 may be associated with a corresponding indication as to whether a vehicle driving assistance system is available. In the table shown, "0" is used to indicate unavailability, while "1" is used to indicate availability of a control component and a driver assistance system. For example, the first column of FIG. 4 shows a case where sensor 1 of FIG. 3 is unavailable. Since sensor 1 provides information used by both the ACC and the lane-keeping capabilities, the unavailability of sensor 1 means that the ACC and lane-keeping capabilities are unavailable. This condition is indicated by the "0" in both the "ACC" and "lane-keeping" rows of the lookup table.

Similarly, the fourth column of FIG. 4 shows a condition where the portion 14x of computing system controlling the lane keeping function is unavailable (for example, due to a hardware or software malfunction), as indicated by the "0" in the "lane keeping control" row. Thus, in this case, the lane-keeping system is unavailable. This condition is indicated by the "0" in the corresponding "lane-keeping" row 701 of the lookup table. In contrast, the fifth column of the table shows a condition where all of the control components used to provide the ACC and lane-keeping capabilities are functioning properly (i.e., all the indicator parameters have a value of "1"). The availability or statuses of these systems is indicated by the "1" in the corresponding "ACC" 703 and "lane-keeping" 701 rows of the lookup table, which indicated the availability of these systems.

As previously described, control components may be unavailable for any of a variety of reasons. A lookup table as seen in FIG. 4 may be structured to indicate the availability of any driver assistance capability (for example, ACC) in accordance with the statuses of any associated combination of control components. Thus, FIG. 4 shows one example of how driver assistance system status may be determined by the availability of the vehicle components and/or systems used to provide the associated driver assistance system capability.

Alternative schemes may also be used for assigning numerical values representing the availabilities of various driving assistance systems.

Driving conditions may also include vehicle operating conditions. Vehicle operating conditions may include any conditions aside from the statuses of the driver assistance systems and components which may impact safe operation of the vehicle, either by the driver assistance systems or by a human operator. Computing system 14 may be configured to continuously receive and/or gather information on parameters relating to vehicle operating conditions as described herein.

Some examples of particular vehicle operating conditions include the presence or absence of rain, snow, and/or ice on the road; the presence or absence of potholes or debris on the road; speed limits; the presence (and proximity or distance from the ego-vehicle) of safety shoulders on one or both sides of the road; current traffic density in the vicinity of the ego-vehicle; driver physical and mental condition; ego-vehicle speed; the detection ranges of the ego-vehicle sensors; and which traffic lane the ego-vehicle is currently traveling in.

The computing system 14 may be configured to receive and process pertinent vehicle operating condition information from any of a variety of sources depending on the nature of the information and the need for the information. For example, information relating to vehicle operating conditions may be received from sensor system 28, a vehicle navigation system, other vehicles surrounding the ego-vehicle, satellite systems, roadside stations, etc. Operating condition information on the configuration of a planned route and the presence or absence of safety shoulders may be available from GPS system maps or from another navigation information system. Route information usable for the purposes described herein may come from any suitable source, such as ego-vehicle sensors, one or more navigation systems (for example, a GPS system), other vehicles traveling (or which have traveled) the same route as the ego-vehicle, and/or any other suitable source. Road structural condition information (including the presence or absence of potholes or debris) may be obtained from the ego-vehicle sensors, from information stored in a navigational or municipal database, or from any other suitable source. Local weather conditions (which may describe the presence or absence of rain, snow, and/or ice) may be obtained from a weather satellite system and/or from the ego-vehicle sensors. Current local traffic conditions may also be obtained from ego-vehicle sensors and/or from a satellite system, for example. Information relating to the physical and/or mental condition of the driver may be obtained from driver condition-related sensors, such as cameras, touch-activated biometric sensors, and any other suitable detection devices. The ego-vehicle may be configured to receive information relating to any pertinent operating condition parameter from any suitable source.

To aid in evaluating the vehicle operating conditions and changes the conditions, the computing system 14 may also be configured for constantly calculating, assigning, and/or updating (using suitable algorithms, lookup tables, fuzzy logic and/or other tools, if needed) a relative quantity or numerical comparison value for each of the above-mentioned operating condition parameters (e.g., traffic density, the presence or absence of a safety shoulder, etc.) based on the received driving condition information. The assigned comparison values then provide bases for comparison and evaluation. The comparison value of each driving condition parameter may then be compared with an associated threshold value for the parameter.

In one example, the data and other information relating to the vehicle operating conditions is processed so as to generate relatively higher numerical values to represent conditions conducive to autonomous driving operations, and relatively lower numerical values to represent conditions not conducive to autonomous driving operations.

In one example, the computing system 14 may determine (from route navigation information, sensor information and/or other sources) if the portion of the road the vehicle is currently driving on has a safety shoulder along either side. If a safety shoulder is present along one side of the road, a relatively higher numerical value may be assigned to a "safety shoulder" operating condition parameter. This value may be higher than the value assigned to the "safety shoulder" operating condition parameter if the stretch of road contained no safety shoulder. Similarly, if the portion of the road has a safety shoulder along both sides of the road, the numerical value assigned to the "safety shoulder" operating condition parameter may be higher than the value assigned if a shoulder is present along only one side of the road. This is because driving may be considered to be safer when a safety shoulder is available along one or more sides of the road. The presence of the safety shoulder enhances the ability of the vehicle (whether driven manually or autonomously) to achieve a safe condition if the need arises.

Thus, data or information indicating the presence of a safety shoulder may be assigned a relatively high comparison value, while data or information indicating the absence of a safety shoulder may be assigned a relatively low comparison value, for purposes of valuating the "presence of safety shoulder" operating condition. For example, if the ego-vehicle is driving in a left-most lane and the only currently available safety shoulder is located on the right side of the road, the vehicle will need more time to move to the shoulder if the need arises. Thus, in one example, if the ego-vehicle is driving in the left-most lane but the only available safety shoulder is on the right side of the road, a "distance to safety shoulder" operating parameter may be assigned a relatively lower value, for example, a "2" on a scale of "1" to "10". Conversely, if the ego-vehicle is driving in the right-most lane, the "distance to safety shoulder" parameter may be assigned a relatively higher value, for example, an "8" or a "9", because the ego-vehicle can simply change lanes onto a presumably empty safety shoulder whenever the need arises.

Similarly, traffic density may affect the ability of the vehicle to move to the shoulder. If the traffic density near the ego-vehicle is determined to be relatively high, the "traffic density" parameter may also be assigned a relatively lower value (for example, a "2") reflecting the fact that heavier traffic may make it more difficult for the ego-vehicle to move to the safety shoulder if the need arises.

Another pertinent factor is the current proximity of the vehicle to a safety shoulder. For example, if the ego-vehicle is driving in a left-most lane and the only currently available safety shoulder is located on the right side of the road, the vehicle will need more time to move to the shoulder if the need arises. Thus, data or information indicating close proximity of the ego-vehicle to a safety shoulder may be assigned a relatively high comparison value, while data or information indicating a greater distance of the current driving lane from the safety shoulder may be assigned a relatively low comparison value, for purposes of valuating a "proximity to safety shoulder" operating condition.

In another example, a suitable algorithm may be provided for calculating a numerical value for traffic density in the vicinity of the ego-vehicle. The algorithm may be configured to generate a relatively higher numerical value (reflecting relatively safer driving conditions) for a relatively lower traffic density, and to generate a relatively lower numerical value (reflecting less safe driving conditions) for a relatively higher traffic density. This is under an assumption that a lower traffic density will be less demanding on the detection and/or reaction capabilities of autonomous systems. Thus, data or information indicating a relatively high traffic density in the vicinity of the ego-vehicle may be assigned a relatively low comparison value, while data or information indicating a relatively low traffic density in the vicinity of the ego-vehicle may be assigned a relatively high comparison value (indicating that a low traffic density is conducive to vehicle operation at a relatively higher automation level), for purposes of valuating a "traffic density" operating condition.

For purposes of determining the traffic density, any suitable criteria may be used. In one embodiment, the traffic density may be determined with regard to all vehicles within a predetermined distance of the ego-vehicle. In another embodiment, the traffic density may be determined with regard to all vehicles within the range of any sensors configured for detecting other vehicles driving on the same road as the ego-vehicle. Other criteria may also be used.

The sensor range may be the maximum range (under current driving conditions) of any sensors configured for detecting other vehicles and obstacles in the path of the ego-vehicle. The maximum range may be a maximum range at which the sensor is specified to operate or detect under certain predetermined conditions. If another vehicle is detected at this range and under the specified conditions (or under superior conditions), the computing device may assume that the sensor is operating at optimum efficiency. Sensor range may be adversely affected by weather conditions, possibly increasing the time needed for the sensor to detect a condition and correspondingly reducing the amount of time available for driver or autonomous system reaction to the condition.

For example, a maximum distance at which another may be detected may be reduced by rain of fog. Thus, data or information indicating a relatively long vehicle sensor range may be assigned a relatively high comparison value, while data or information indicating a relatively short vehicle sensor range may be assigned a relatively low comparison value, for purposes of valuating a "traffic density" operating condition.

In addition, a numerical value may be determined for each sensor, reflecting the range of that particular sensor under current vehicle operating conditions. This is because relatively greater sensor ranges tend to increase allowable reaction time for both human drivers and automated systems. If a sensor provides information used to determine another operating condition parameter value, lookup tables may be provided which associate a measured sensor data value (or a range of measured values) with a specific numerical value for the operating condition parameter. Similarly, if multiple sensors provide information used to determine an operating condition parameter value, a formula or algorithm may be provided for weighting and/or combining or otherwise processing the information received from the various sensors, for determining an operating condition sensor parameter value usable for the purposes described herein. Other methods of determining numerical values for the operating condition parameters may also be used.

In another example, a relatively greater ego-vehicle speed may reduce the time the driver or the autonomous system has to respond to a detected condition. Thus, for example, if the ego-vehicle is traveling relatively faster, an "ego-vehicle speed" operating parameter may be assigned a relatively lower value reflecting the reduced available driver and/or autonomous system response time. Thus, data or information indicating a relatively high ego-vehicle speed may be assigned a relatively low comparison value, while data or information indicating a relatively low vehicle speed may be assigned a relatively high comparison value, for purposes of valuating an "ego-vehicle speed" operating condition.

The vehicle operating parameter information may be processed to provide comparison values using any suitable method(s) (such as lookup tables, algorithms, functions and/or formulae, etc.). Any of these tools may be used to process sensor data relating to a given operating condition so as to generate a comparison value reflecting the condition. In addition, operating parameter information may be obtained from sources exterior of the ego-vehicle. For example, weather and traffic information may be received via wireless transmissions from satellite feeds or ground stations.

Figure 2:
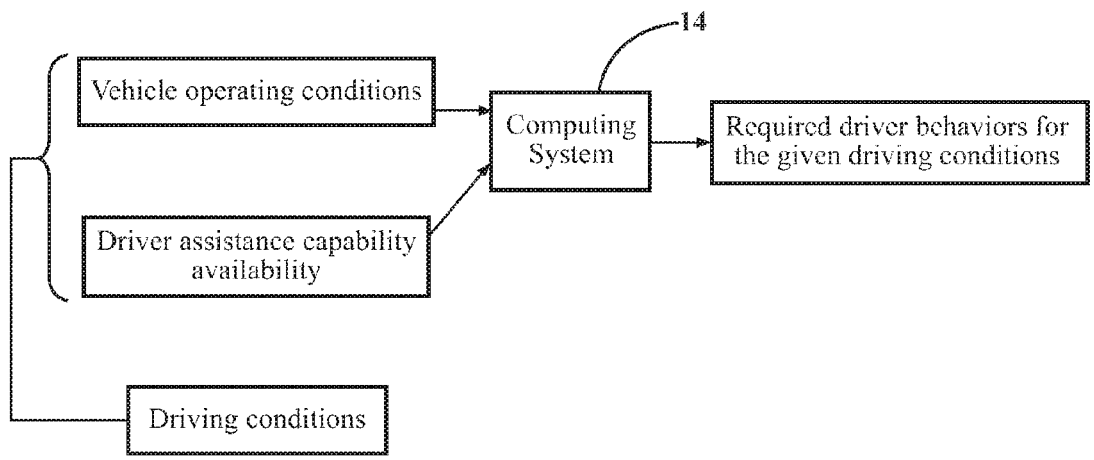
FIG. 2 is a schematic diagram illustrating one method of determining of required driver behaviors using the vehicle computing system.

Receipt and processing of operating condition information to generate comparison values of operating condition parameters is illustrated schematically in FIG. 2, which shows operating condition information received by computing system 14 from sensors 28 and other information sources. This information is then processed to generate vehicle operating condition comparison values.

The comparison values determined for the operating parameters may be constantly updated to reflect the current vehicle operating conditions. This process may produce an associated adjustment in the required driver behaviors as described herein, to reflect changing operating conditions and/or vehicle control component status changes.

After determination of the operating condition comparison values, the driver assistance system availabilities and operating condition comparison values may be evaluated to determine if the vehicle can, under the current driving conditions, position and/or operate itself so as to remain in a safe condition until the driver can reassert control of the vehicle. For example, each operating condition comparison value may be compared a threshold value for the operating condition. If the comparison value is above the threshold, this may indicate that this operating condition is favorable to the ability of the vehicle to position and/or operate itself so as to remain in a safe condition until the driver can reassert control of the vehicle. Conversely, if the comparison value is below the threshold, this may indicate that this operating condition is not favorable to the ability of the vehicle to position and/or operate itself so as to remain in a safe condition until the driver can reassert control of the vehicle.

Threshold values for comparison with comparison values of vehicle operating condition parameters may be determined, for example, by identifying a range of values for each operating condition parameter. The threshold value for each operating condition parameter may then be a value somewhere between a minimum possible value of the parameter and a maximum possible value for the parameter. The minimum and maximum values may depend on the methods used to measure and valuate the particular parameter. A threshold value closer to the maximum value will be a relatively higher threshold, while a threshold value closer to the minimum value will be a relatively lower threshold.

Some operating conditions may be more determinative than others with regard to the vehicle ability to "make safe". Thus, these parameters may be given more weight in the determination of the vehicle's ability to "make safe". For example, if the ego-vehicle is traveling a the right-most traffic lane and adjacent a safety shoulder, then the "safety shoulder proximity" parameter will be very high, and the computing system may determine based on this condition alone that the vehicle can "make safe" if needed. In some cases, it may also be desirable to weight the operating condition values and evaluate the values in combination due to the fact that, in certain conditions, the value of one operating condition may affect the value(s) of one or more other operating conditions, and also the final determinations as to whether the vehicle can "make safe".

If the vehicle operating conditions and driver assistance availability are not such that the vehicle can "make safe", the required driver behaviors may be adjusted or specified (in accordance with the current driver assistance availability and vehicle operating conditions) to help ensure that the vehicle can warn the driver of a condition necessitating driver control or increased driver involvement, in time for the driver to reassert control of the vehicle within the predetermined time period (i.e., to help ensure an ability to "warn driver"). In particular embodiments, the predetermined time period is within the range 2-3 seconds.

Processing the vehicle operating conditions and driver assistance availabilities to obtain associated determinations of the vehicle's ability to "make safe" and the vehicle's ability to warn the driver may be done using any suitable methods, for example, lookup tables, algorithms, equations, etc. Any thresholds, lookup tables, relationships, algorithms, etc. used to evaluate the vehicle operating conditions for the purposes described herein may be stored in a memory.

If the computing system determines, based on an evaluation of the operating conditions and the autonomous driver assistance capability availability, that the vehicle can position and/or operate itself so as to remain in a safe condition until a driver can reassert control of the vehicle, the required driver behaviors may be determined on this basis. If the vehicle operating conditions and driver assistance availability are such that the vehicle can "make safe" if needed, the required driver behaviors may be adjusted (within the limits imposed by the current driver assistance availability and vehicle operating conditions) so that they are less demanding on the driver and/or fewer in number.

However, if it is determined that the vehicle cannot (or may not be able to) position and/or operate itself so as to remain in a safe condition until a driver can reassert control of the vehicle, the required driver behaviors may be determined so that, under the current driving conditions, the vehicle can warn the driver of a condition necessitating driver control or increased driver involvement, in time for the driver to reassert control of the vehicle within a predetermined time period. To associate particular driver assistance system availabilities, operating condition comparison values, and combinations thereof with one or more required driver behaviors, computing system 14 may be configured to use suitable algorithms, lookup tables, fuzzy logic and/or other suitable tools.

FIG. 2 illustrates schematically the determination of required driver behaviors by computing system 14. Inputs to the computing system 14 for processing the driving conditions may include the current driver assistance capability availabilities and vehicle operating conditions, as previously described. Outputs include the required driver behaviors for the given set of current driver assistance availabilities and vehicle operating conditions. The current driver assistance availabilities and vehicle operating conditions may be constantly monitored and processed to update the currently required driver behaviors. The following examples illustrate how various possible driving situations may be evaluated by the computing system.

Example 1

Safety shoulder on right side of road
Ego-vehicle traveling in right lane next to shoulder
Ego-vehicle speed high
Traffic density high
sensor range good In this example, the ego-vehicle speed is high and the traffic density is relatively high, situations which might tend to favor increased driver involvement or control. However, the sensor range is good which facilitates early problem detection and increases the time available for the vehicle and driver to respond. Also, the ego-vehicle is traveling in a lane next to the safety shoulder. In these driving conditions, the computing system may determine that the ego-vehicle can "make safe". Thus, the required driver behaviors may be specified so that the number of required driving behaviors (and/or the demand imposed by the behaviors) may be relatively lower.

Example 2

Safety shoulder on right side of road
Ego-vehicle traveling in left most lane
Traffic density low
sensor range good
Nearest vehicle in front or to side of ego-vehicle is at least 10 car lengths In this example, even though the ego-vehicle is traveling in the left-most lane, because the traffic density is low, the minimum distance between the ego-vehicle and other vehicles is so great, and the sensor range is excellent, the computing system may determine that the ego-vehicle can "make safe" under the existing driving conditions, if needed. Thus, the required driver behaviors may be specified so that the number of required driving behaviors (and/or the demand imposed by the behaviors) may be relatively lower.

Example 3

Safety shoulder on right side of road
Ego-vehicle traveling in left most lane
Traffic density high
sensor range good
Nearest vehicle in front or to side is at least 10 car lengths In this example, the ego-vehicle speed is high and the traffic density is relatively high, situations which might tend to favor increased driver involvement or control. The sensor range is high, but ego-vehicle is traveling in the left-most lane. Under these conditions, the computing system 14 may determine that, even though a problem may be detected early, the vehicle may be unable to reach the safety shoulder in time to make the vehicle safe, if needed. Thus, the number and/or type of required driving behaviors may be adjusted to increase demands on the driver, to ensure that the driver can assume vehicle control within the predetermined time period.

Example 4

Same conditions as Example 1, except sensor range low.

Under these conditions, the computing system may determine that, even though the vehicle is traveling in the right-most lane, the vehicle may be unable to detect a problem in time to "make safe". Thus, the number and/or type of required driving behaviors may be adjusted to increase demands on the driver, to ensure that the driver can assume vehicle control within the predetermined time period.

The above examples show how combinations of driving conditions can affect the determination as to whether the vehicle can "make safe", and also how a single parameter may exert a relatively large influence on the required driving behaviors. For example, a relatively long sensor range is important for early detection of possible problems. Sensors are also necessary for the functioning of driver assistance systems. Thus, unavailability of a sensor or a reduction in detection range (for example, due to weather conditions) may result in a determination that it will not be certain that the vehicle can "make safe" under the existing driving conditions, and that the required driver behaviors must be adjusted to facilitate increased driver control within the predetermined time period, if needed.

Different available driving assistance capabilities and/or vehicle operating conditions may provide either an enhanced or a decreased ability of the vehicle to warn the driver of a condition necessitating driver control or increased driver involvement, in time for the driver to reassert control of the vehicle, and/or an enhanced or a decreased ability of the vehicle to (if the driver cannot reassert control when prompted) position and/or operate itself so as to remain in a safe condition until the driver can reassert control of the vehicle. Depending on the requirements of a particular application, all of the available operating condition information may be used in these determinations, or only selected parameters may be used in these determinations.

The amount of time required for the driver to gain situational awareness and reassert control of the vehicle may depend on the behaviors he/she is allowed to exercise. For example, if the driver is permitted to takes his hands off the wheel, his eyes off the road, and rotate his seat to an orientation facing to a side or rear of the vehicle, it will take him longer to reassert control than if he only took his hands off the wheel.

In addition, certain operating conditions may have a greater effect than others on the ability of the vehicle to warn the driver of such a condition. Some vehicle operating conditions which may affect the amount of time the vehicle has to warn the driver and the time the driver has to respond to the warning include ego-vehicle speed, the effective current ranges of the vehicle sensors, the distance of the ego-vehicle from a closest vehicle in front of the ego-vehicle in the same lane, the distances of other vehicles in adjacent lanes from the ego-vehicle, local traffic density, and road conditions (i.e., the presence of snow, rain, black ice, debris, etc.). Other operating conditions may also be relevant to this determination. Sensor range may be adversely affected by weather conditions, possibly increasing the time needed for the sensor to detect a condition and correspondingly reducing the amount of time available for driver reaction to the condition.

Some vehicle operating conditions which may affect the ability of the vehicle to self-position and/or self-operate to achieve a safe state include route configuration, the presence of a safety shoulder along the road the ego-vehicle is driving on, the distance to the closes safety shoulder, traffic density in the vicinity of the ego-vehicle, ego-vehicle speed, and current speed limits. Other operating conditions may also be pertinent to the current driving and operating conditions.

Some examples of possible required driving behaviors include "Feet on the accelerator and/or brake pedals", "Hands on wheel", "Eyes on road", "Driver seat pointing forward/not swiveled, and upright", and "Driver must be awake". Other behaviors are also possible depending on the available autonomous driving assistance systems, various specific driving conditions, and other factors. For example, in the "Hands On Wheel" behavior, the driver must keep his hands on the wheel during driving as if he/she were driving manually. In the "Eyes On Road" behavior, the driver must keep his eyes on the road during driving as if he/she were driving manually. In the "Seat pointing forward and upright" behavior, the driver seat must be facing toward the front of the vehicle and the seat back must be angled upright sufficiently for the driver to see the road while driving, just as if he/she were driving manually. In the "feet on the accelerator and/or brake pedals" behavior, the driver must have his/her feet on the accelerator or brake pedal as if he/she were driving manually. In the "driver Must be awake" behavior, the driver, must remain awake. These behaviors are directed to helping to ensure that at least one of the "ability to warn" and "remain safe" conditions previously described will be met under all vehicle driving and operating conditions. Computing system 14 may be configured to, using information from various vehicle sensors (such as steering wheel contact sensors, internal cameras configured to monitor driver behavior or actions, seat sensors, accelerator and brake pedal sensors, and other sensors) monitor the driver actions relating to the required driver behaviors.

In one particular example, the possible driver behaviors may be organized into tiered group of behaviors. Behaviors that may be considered relatively more demanding on the driver may be lower level behaviors and given a relatively lower position in the tier, and a lower number. Conversely, behaviors that may be considered relatively less demanding on the driver may be higher level behaviors and given a relatively higher position in the tier, and a higher number. One example of such a ranking is shown in FIG. 5. The highest level shown (level 6) does not require any driving behaviors. This level may be acceptable, for example, in a fully autonomous vehicle with all driver assistance systems available and operating under optimal vehicle operating conditions. In this embodiment, if desired, it may be assumed that if a particular behavior is required, then all of the behaviors above that behavior on the list are also required. For example, if behavior #3 ("eyes on road") is required, then the computing system assumes that all behaviors 4-5 are also required. This may reduce the number of distinctive patterned sounds needed to convey an associated combination of behaviors to the driver.

The embodiments described herein use a distinct ongoing, persistent sound to indicate an associated distinct set of required driver behaviors. Each combination of required driver behaviors may be associated with a distinctive persistent sound. As used herein, the term "persistent sound" refers to a sound which is constantly projected into and always present within the vehicle occupant compartment. The sound may be a constant, steady sound of uniform pitch and/or volume. Alternatively, the sound may be defined by a constantly repeating pattern. The use of a distinct ongoing, persistent sound to indicate an associated distinct set of required driver behaviors may obviate the need for the driver to actively try to ascertain the vehicle autonomous mode or the currently required driver behaviors, for example, by looking at a vehicle display.

A notification including the sound may be generated when the required driver behaviors have been determined. "Generating a notification" includes producing and transmitting a message directed at the driver, and which contains information relating to operation of the vehicle. The notification may contain other information as well as the persistent sound.

Figure 6:
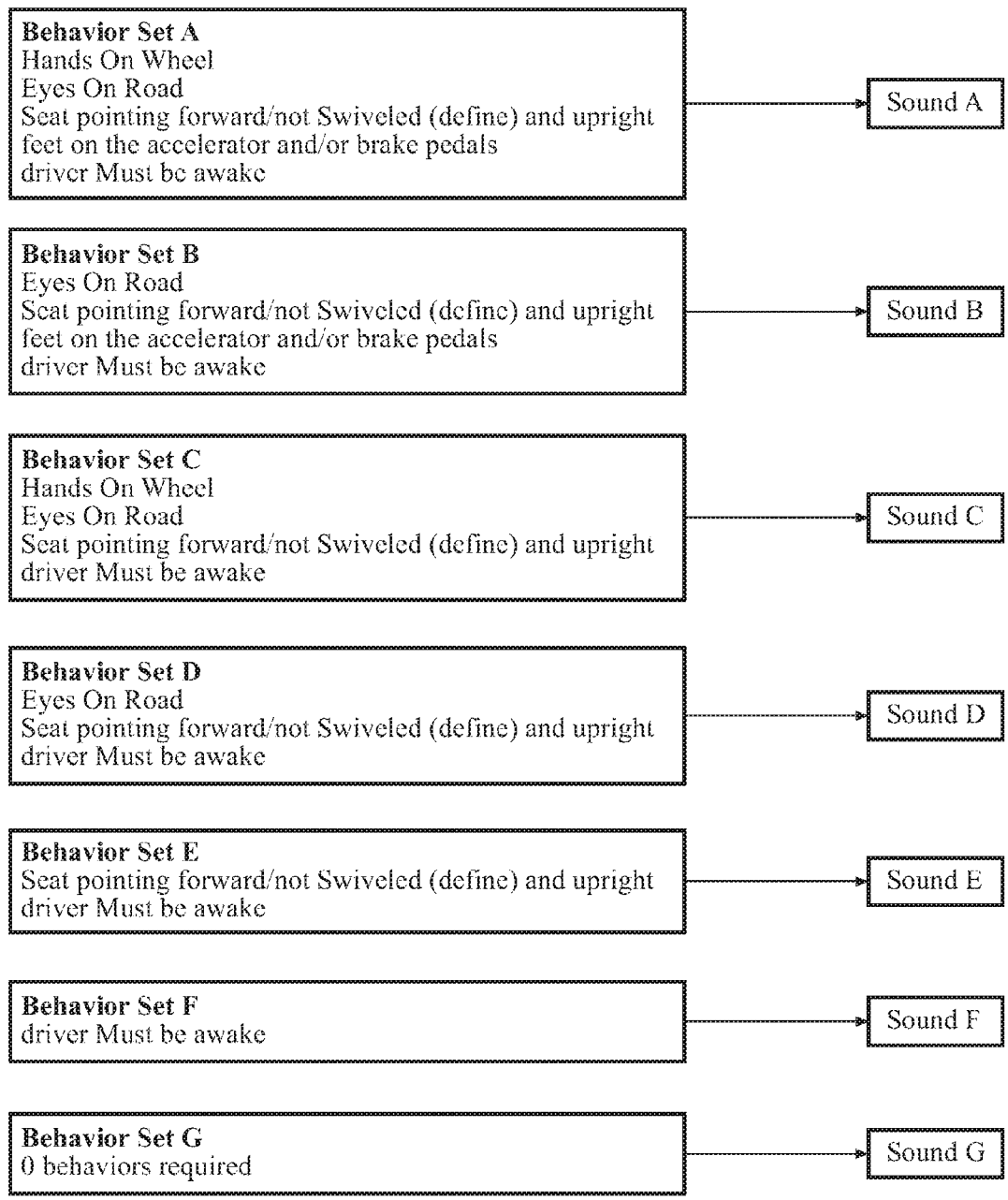
FIG. 6 shows examples of possible distinctive combinations of driver behaviors and associated persistent sounds.

FIG. 6 shows examples of possible distinctive combinations of driver behaviors and associated persistent sounds. Other behavior combinations than those shown are also possible. For example, in the example shown in FIG. 6, if the computing system 14 determines that the behaviors shown in behavior set "A" are required under the current driving conditions, the computing system will send instructions to the sound generating system 99 that persistent sound "A" is to be generated. A notification including sound A is generated and transmitted into the vehicle occupant compartment or otherwise conveyed to the driver (for example, via the HMI 109, or via a headset worn by the driver).

The various sounds transmitted to or provided to the driver may be generated by a sound generating system 99 incorporated into (or operatively coupled to) computing system 14. The sounds may be transmitted through speakers in the HMI 109 or using any other suitable medium. In addition, any changes in required driver behaviors (for example, due to associated changes in available driver assistance capabilities and/or vehicle operating conditions) are indicated to the driver by a change in the persistent sound notification. Such a change may be preceded by generation and transmission of a transitional sound notification to the driver. As used herein, the term "transitional sound notification" relates to a sound notification that is inserted between a first persistent sound notification (reflecting a first set of required driver behaviors) and a second persistent sound notification (reflecting a second, revised set of required driver behaviors).

Computing system 14 may also be configured to continuously determine if the required driver behaviors are being complied with. Computing system 14 may also be configured to if the required behaviors are not being complied with, determine a sound indicating non-compliance, and provide a sound notification including the sound indicating non-compliance. Non-compliance of the driver with the required driver behaviors may be detected using any suitable means, depending on the particular behavior. For example, failure of the driver to keep his/her hands on the wheel may be detected by a camera configured to monitor the vehicle interior or a steering wheel contact sensor. Failure of the driver to keep his/her eyes on the road may be detected by a camera configured to monitor the driver. Failure to maintain the driver seat in a forward-facing orientation and/or upright may be detected by suitably configured seat sensors. Failure of the driver to keep his/her feet on the accelerator and/or brake pedals may be detected by pedal sensors. If the computing systems determines that required one or more driver behaviors are not being complied with, the computing system 14 may control the sound generating system 99 to generate a distinctive persistent sound indicating non-compliance to the driver.

Figure 7:
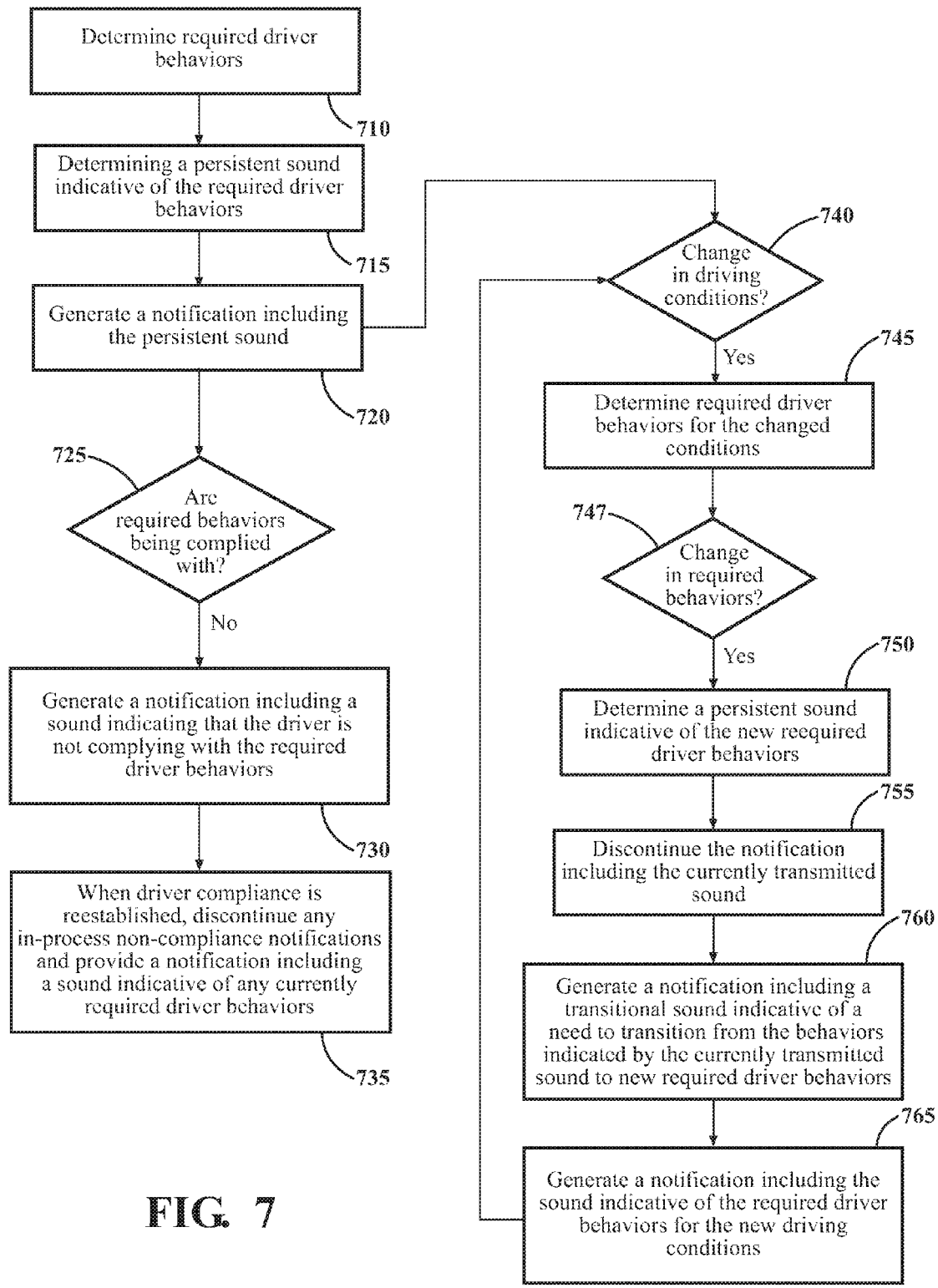
FIG. 7 is a flow diagram illustrating a method of informing a driver of required driver behaviors during autonomous or semi-autonomous operation of a vehicle, in accordance with an embodiment described herein.
Figure 8:
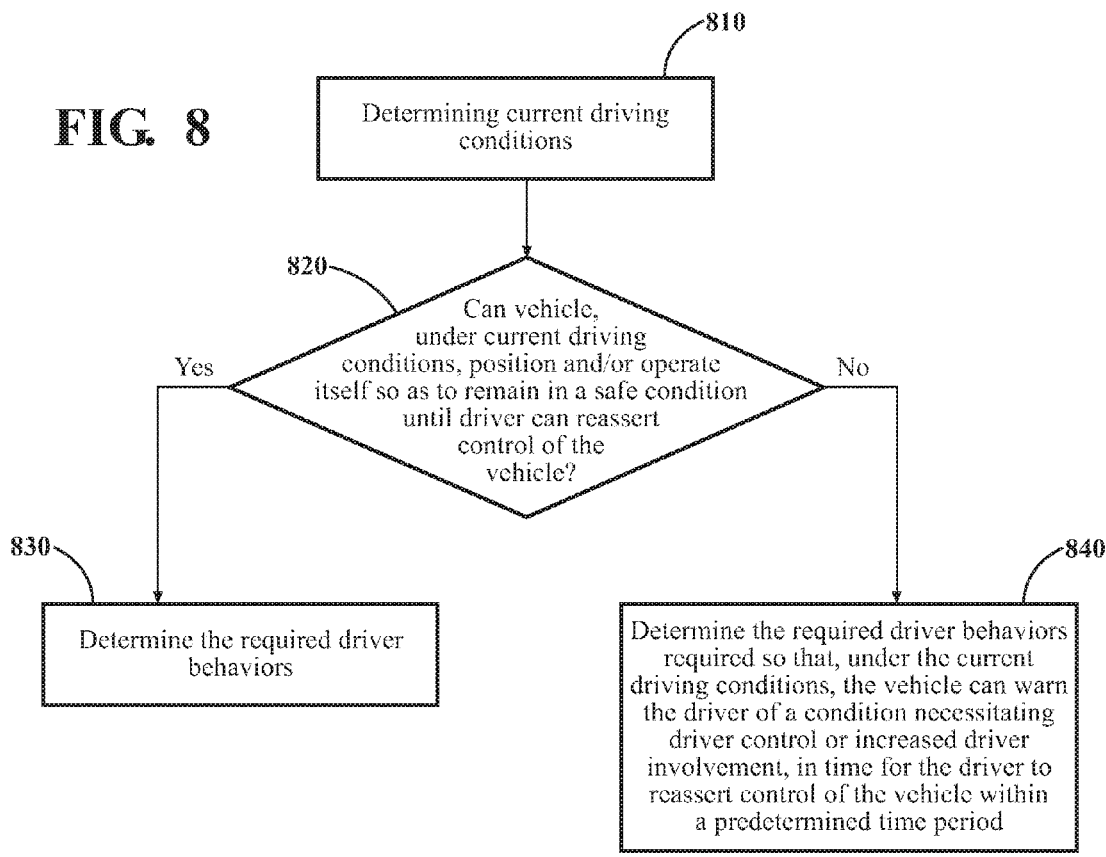
FIG. 8 is a flow diagram illustrating one method for determining required driving behaviors.
Figure 9:
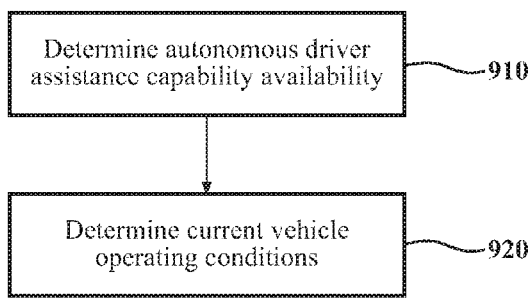
FIG. 9 is a flow diagram illustrating one method of determining the current driving conditions.

FIGS. 7-9 are flow diagrams illustrating operation of the vehicle systems to determine required driver behaviors and generate notifications including persistent sounds to the driver indicative of the required behaviors.

In FIG. 7, in block 710, the required driver behaviors for the current driving conditions are determined. In block 715, the computing system 14 determines a persistent sound indicative of the required driver behaviors.

In block 720, the computing system 14 controls the sound generating system 99 so as to generate a notification including the persistent sound. The system then constantly monitors (in block 725) whether the required behaviors are being complied with. This may be done by processing information received from the vehicle sensors. For example, sensors operatively coupled to the seat can determine the direction the seat is facing, for determining if the seat is pointing in a forward direction. Also, the driver monitoring system camera can provide data usable to determine if the driver's eyes are on the road, or if the driver is awake. As long as the required behaviors remain the same and are being complied with, the sound generating system 99 is controlled so as to continue generating the current persistent sound.

If the required behaviors are not being complied with, the computing system 14 controls the sound generating system 99 to generate a notification including a sound indicating that the driver is not complying with the required driver behaviors. The non-compliance sound may be generated in any of a number of ways. In one example, a volume of the existing driver assistance capability availability sound may be increased until all required behaviors are complied with. In another example, an additional sound (for example, a patterned or intermittent sound) may be overlaid on top of or in addition to the existing driver assistance capability availability sound, until all required behaviors are complied with. In another example, a completely different sound may replace the existing driver assistance capability availability sound, until all required behaviors are complied with. In a particular embodiment, a different non-compliance sound may be provided for each different driver assistance mode.

In a particular embodiment, a visual and/or spoken word non-compliance notification may be provided via speakers or a visual display. This optional non-compliance notification may reinforce the non-compliance notification provided by the non-compliance sound.

When driver compliance is reestablished, the computing system (in block 735) discontinues any in-process non-compliance notifications and instructs the sound generating system 99 to provide a notification including a sound indicative of any currently required driver behaviors.

Returning to block 720, the computing system may, simultaneously with determining if currently required behaviors being complied with, determine (in block 740) if there is any change in driving condition. If there is no change in driving conditions, the sound generating system 99 may continue to generate the sound it is currently generating. If there is a change in driving conditions, the computing system (in block 745) may determine the driver behaviors required for the new driving conditions. The computing system then (in block 747) may compare the new required driver behaviors with the driver behaviors indicated by the currently transmitted sound. If the required behaviors have not changed, the sound generating system 99 may continue to generate the sound it is currently generating.

If the required behaviors have changes, the system may (in block 750) determine a persistent sound indicative of the new required driver behaviors. The system may then (in block 755) discontinue the notification including the currently transmitted sound. The system may then (in block 760) generate a notification including a transitional sound indicative of a need to transition from the behaviors indicated by the currently transmitted sound to new required driver behaviors. The system may then (in block 765) generate a notification including the sound indicative of the required driver behaviors for the new driving conditions.

FIG. 8 is a flow diagram illustrating one method for determining required driving behaviors. In block 810, the computing system determines current driving conditions. In block 820, the system determines if the vehicle can, under current driving conditions, position and/or operate itself so as to remain in a safe condition until a driver can reassert control of the vehicle. If the vehicle can, under the current driving conditions, position and/or operate itself so as to remain in a safe condition until the driver can reassert control of the vehicle, the computing system may (in block 830) determine the required driver behaviors. If the vehicle cannot, under the current driving conditions, position and/or operate itself so as to remain in a safe condition until the driver can reassert control of the vehicle, the computing system may (in block 840) determine the driver behaviors required so that, under the current driving conditions, the vehicle can warn the driver of a condition necessitating driver control or increased driver involvement, in time for the driver to reassert control of the vehicle within a predetermined time period.

FIG. 9 is a flow diagram illustrating one method of determining the current driving conditions. In block 910, the computing system determines autonomous driver assistance capability availability, in the manner previously described or using any other suitable method. In block 920, the system determines current vehicle operating conditions, in the manner previously described or using any other suitable method.

The flow diagrams and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A computing system for a vehicle, the computing system comprising one or more processors for controlling operation of the computing system, and a memory for storing data and program instructions usable by the one or more processors, wherein the one or more processors are configured to execute instructions stored in the memory to:
   determine required driver behaviors for current driving conditions;
   determine a persistent sound indicative of the required driver behaviors for the current driving conditions;
   generate a notification including the persistent sound, wherein the persistent sound is constantly generated until the driver behaviors indicated by the persistent sound are no longer required, or until the required driver behaviors change;
   responsive to a change in driving conditions from the current driving conditions to new conditions, determine required driver behaviors for the new conditions;
   determine if the required driver behaviors for the new conditions are different from the behaviors indicated by a currently transmitted persistent sound;
   if the required driver behaviors are different, determine a persistent sound indicative of the required driver behaviors for the new conditions;
   after determining a persistent sound indicative of the required driver behaviors for the new conditions, discontinue the notification including the currently transmitted persistent sound; and
   generate a notification including the persistent sound indicative of the required driver behaviors for the new conditions,
   wherein the persistent sound indicative of the required driver behaviors for the new conditions is constantly generated until there is no longer any requirement for the required driver behaviors for the new conditions, or until the required behaviors change.

2. The system of claim 1 wherein the one or more processors are configured to execute instructions stored in the memory to:
   determine the current driving conditions;
   determine if the vehicle can, under current driving conditions, position and/or operate itself so as to remain in a safe condition until a driver can reassert control of the vehicle; and
   responsive to the determination as to whether the vehicle can, under the current driving conditions, position and/or operate itself so as to remain in a safe condition until the driver can reassert control of the vehicle, determine the required driver behaviors for the current driving conditions.

3. The system of claim 2 wherein the one or more processors are configured to execute instructions stored in the memory to, if it is determined that the vehicle cannot position and/or operate itself so as to remain in a safe condition until the driver can reassert control of the vehicle, determine the required driver behaviors required so that, under the current driving conditions, the vehicle can warn the driver of a condition necessitating driver control or increased driver involvement in time for the driver to reassert control of the vehicle within a predetermined time period.

4. The system of claim 1 wherein a persistent sound indicative of any required driver behaviors is constantly generated until it is determined that the required driver behaviors are not being complied with.

5. The system of claim 1 wherein the one or more processors are configured to execute instructions stored in the memory to, after discontinuing the notification including the currently transmitted persistent sound, and before generating the notification including the persistent sound indicative of the required driver behaviors for the new conditions, generate a notification including a transitional sound indicative of a need to transition from the behaviors indicated by the currently transmitted persistent sound to new required driver behaviors.

6. The system of claim 1 wherein the one or more processors are configured to execute instructions stored in the memory to:
   determine if the required driver behaviors are being complied with; and
   if any required driver behaviors are not being complied with, generate a notification including a persistent sound indicative of the non-compliance,
   wherein the persistent sound indicative of the non-compliance is generated until the required driver behaviors are being complied with.

7. The system of claim 6 wherein the one or more processors are configured to execute instructions stored in the memory to, when driver compliance with the required driver behaviors is established, discontinue any in-process non-compliance notifications and provide a notification including a sound indicative of any currently required driver behaviors.

8. A method of informing a driver of required driver behaviors during autonomous or semi-autonomous operation of a vehicle, comprising steps of:
   determining required driver behaviors for current driving conditions;
   determining a persistent sound indicative of the required driver behaviors for the current driving conditions;
   constantly generating a notification including the persistent sound, until the driver behaviors indicated by the persistent sound are no longer required, or until the required driver behaviors change;
   responsive to a change in driving conditions from the current driving conditions to new conditions, determining required driver behaviors for the new conditions;
   determining if the required driver behaviors for the new conditions are different from the behaviors indicated by a currently transmitted persistent sound;
   if the required driver behaviors are different, determining a persistent sound indicative of the required driver behaviors for the new conditions;

after determining a persistent sound indicative of the required driver behaviors for the new conditions, discontinuing the notification including the currently transmitted persistent sound; and generating a notification including the persistent sound indicative of the required driver behaviors for the new driving conditions, wherein the persistent sound indicative of the required driver behaviors for the new driving conditions is constantly generated until there is no longer any requirement for the required driver behaviors for the new driving conditions, or until the required behaviors change.

9. The method of claim 8 wherein the step of determining required driver behaviors comprises the steps of:

determining the current driving conditions;

determining if the vehicle can, under current driving conditions, position and/or operate itself so as to remain in a safe condition until a driver can reassert control of the vehicle; and responsive to the determination as to whether the vehicle can, under the current driving conditions, position and/or operate itself so as to remain in a safe condition until the driver can reassert control of the vehicle, determine the required driver behaviors for the current driving conditions.

10. The method of claim 9 wherein the step of determining the required driver behaviors responsive to whether the vehicle can position and/or operate itself so as to remain in a safe condition comprises the step of, if it is determined that the vehicle cannot position and/or operate itself so as to remain in a safe condition until the driver can reassert control of the vehicle, determining the driver behaviors required so that, under the current driving conditions, the vehicle can warn the driver of a condition necessitating driver control or increased driver involvement, in time for the driver to reassert control of the vehicle within a predetermined time period.

11. The method of claim 9 wherein the step of determining current driving conditions comprises the step of determining current autonomous driver assistance capability availability.

12. The method of claim 9 wherein the step of determining current driving conditions comprises the step of determining current vehicle operating conditions.

13. The method of claim 8 wherein the step of constantly generating a notification including the persistent sound comprises the step of constantly generating a notification including the persistent sound until it is determined that the required driver behaviors are not being complied with.

14. The method of claim 8 further comprising the steps of:

determining if the required driver behaviors are being complied with; and if any required driver behaviors are not being complied with, generating a notification including a persistent sound indicating the non-compliance, wherein the persistent sound indicating the non-compliance is generated until the required driver behaviors are being complied with.

15. The method of claim 14 further comprising the step of, when driver compliance with the required driver behaviors is established, discontinuing any in-process non-compliance notifications and providing a notification including a sound indicative of any currently required driver behaviors.

16. A non-transitory computer readable medium having stored therein instructions executable by a computer system to cause the computer system to perform functions, the functions comprising:

determining required driver behaviors for current driving conditions;

determining a persistent sound indicative of the required driver behaviors for the current driving conditions;

constantly generating a notification including the persistent sound, until the driver behaviors indicated by the persistent sound are no longer required, or until the required driver behaviors change;

responsive to a change in driving conditions from the current driving conditions to new conditions, determining required driver behaviors for the new conditions;

determining if the required driver behaviors for the new conditions are different from the behaviors indicated by a currently transmitted persistent sound;

if the required driver behaviors are different, determining a persistent sound indicative of the required driver behaviors for the new conditions;

after determining a persistent sound indicative of the required driver behaviors for the new conditions, discontinuing the notification including the currently transmitted persistent sound; and generating a notification including the persistent sound indicative of the required driver behaviors for the new driving conditions, wherein the persistent sound indicative of the required driver behaviors for the new driving conditions is constantly generated until there is no longer any requirement for the required driver behaviors for the new driving conditions, or until the required behaviors change.

17. The non-transitory computer readable medium of claim 16 having stored therein instructions executable by a computer system to cause the computer system to perform additional functions comprising:

determining driver compliance with the required driver behaviors; and if the driver is not complying with the required driver behaviors, generating a notification including a persistent sound indicating that the driver is not complying with the required driver behaviors, wherein the persistent sound indicating that the driver is not complying with the required driver behaviors is generated until the required driver behaviors are being complied with.

18. The non-transitory computer readable medium of claim 16 having stored therein instructions executable by a computer system to cause the computer system to perform additional functions comprising constantly generating a persistent sound indicative of any required driver behaviors until it is determined that the required driver behaviors are not being complied with.

* * * * *

UNITED STATES PATENT AND TRADEMARK OFFICE
CERTIFICATE OF CORRECTION

PATENT NO. : 9,969,404 B2
APPLICATION NO. : 15/173601
DATED : May 15, 2018
INVENTOR(S) : John-Michael McNew It is certified that error appears in the above-identified patent and that said Letters Patent is hereby corrected as shown below:

In the Specification

Column 4, Line 6: delete "02" and insert --$O_2$--

Column 10, Line 60: delete "V21" and insert --V2I--

Signed and Sealed this
Twenty-first Day of May, 2019

Andrei Iancu
*Director of the United States Patent and Trademark Office*